United States Patent [19]

Blount

[11] 4,376,178

[45] * Mar. 8, 1983

[54] PROCESS FOR THE PRODUCTION OF POLYOL-ALKALI METAL SILICATE EMULSION

[76] Inventor: David H. Blount, 5450 Lea St., San Diego, Calif. 92105

[*] Notice: The portion of the term of this patent subsequent to Aug. 4, 1998, has been disclaimed.

[21] Appl. No.: 338,347

[22] Filed: Jan. 11, 1982

Related U.S. Application Data

[63] Continuation-in-part of Ser. No. 287,589, Jul. 28, 1981, Pat. No. 4,331,578, which is a continuation-in-part of Ser. No. 191,375, Sep. 29, 1980, Pat. No. 4,262,129, which is a continuation-in-part of Ser. No. 146,474, May 5, 1980, Pat. No. 4,273,908.

[51] Int. Cl.$^3$ .............................................. C08L 3/00
[52] U.S. Cl. .............................. 524/47; 252/188.3 R; 524/44; 524/46; 524/394; 524/442; 524/447; 524/556; 524/557; 524/571; 524/588; 524/593; 524/596; 524/598; 524/603; 525/58; 525/146; 525/158; 525/167; 525/177; 525/187; 525/189
[58] Field of Search ................. 252/188.3 R; 521/154; 528/44, 71, 75, 392; 525/146, 58, 158, 167, 177, 187, 189, 313, 403, 404, 425, 442, 443, 472; 524/44, 46, 47, 394, 442, 447, 556, 557, 571, 588, 593, 596, 598, 603

[56] References Cited

U.S. PATENT DOCUMENTS 4,282,129  8/1981  Blount ................................ 521/154
4,303,768 12/1981  Blount ................................ 521/100

*Primary Examiner*—Morton Foelak

[57] ABSTRACT

A stable polyol-alkali metal silicate emulsion is produced by mixing an aqueous solution of an alkali metal silicate or alkali metal metasilicate pentahydrate, a liquid polyol and a small amount of a salt of an alkali metal compound and a weak acid while heating the mixture to between 40° C. and 100° C. and agitating until the mixture emulsifies.

17 Claims, No Drawings

PROCESS FOR THE PRODUCTION OF POLYOL-ALKALI METAL SILICATE EMULSION

CROSS-REFERENCE TO RELATED APPLICATIONS

This application is a continuation-in-part of my copending U.S. patent application, Ser. No. 287,589, filed on July 28, 1981, now U.S. Pat. No. 4,331,578, which is a continuation-in-part of my copending U.S. patent application, Ser. No. 191,375, filed on Sept. 29, 1980, now U.S. Pat. No. 4,262,129, which is a continuation-in-part of my copending U.S. patent application, Ser. No. 146,474, filed on May 5, 1980, now U.S. Pat. No. 4,273,908.

BACKGROUND OF THE INVENTION

This invention relates to a process for the production of a stable liquid polyol-alkali metal silicate emulsion by mixing an aqueous solution of an alkali metal silicate or alkali metal metasilicate pentahydrate, a liquid polyol and a small amount of a salt of an alkali metal compound and a weak acid while heating to between 40° C. and 100° C. and agitating the mixture until it emulsifies. A salt of an alkaline earth metal and a weak acid may also be used.

An unstable polyol-alkali metal silicate emulsion can be produced by mixing the liquid polyol and alkali metal silicate while heating and agitating, but it is unstable and within a few hours the alkali metal silicate settles to the bottom. The mixture must be re-heated in order to get the alkali metal silicate into an emulsion with the polyol. I have discovered that a stable emulsion of liquid polyol and alkali metal silicate can be produced by adding 1% to 20% by weight, percentage based on the alkali metal silicate, of a salt of an alkali metal compound and a weak acid. The addition of the alkali metal salts of weak acids along with the polyalcohol compound lowers the pH of the alkali metal silicate solution sufficiently to produce an adequate amount of silica gel formation to keep the components in a suspended state. These emulsions are stable for several days, then when some alkali metal silicate settles out it is easily reemulsified by agitating.

A stable liquid polyol-alkali metal silicate emulsion is produced by emulsifying the following components:
Component (a): A liquid alkali metal silicate;
Component (b): A liquid polyol;
Component (c): A salt of an alkali metal compound and a weak inorganic or organic acid.

Component (a)

Any suitable alkali metal silicate may be used in this invention such as sodium, potassium and lithium silicates. The alkali metal silicates are preferred to be in an aqueous solution which contains 40% to 70% alkali metal silicate or an alkali metal metasilicate pentahydrate which melts to form a liquid at a temperature below 100° C. When a solution of sodium silicate, commonly known as "waterglass" is used, it is necessary to add an alkali metal hydroxide in the amount up to 10% by weight, percentage based on "waterglass," in order to avoid coagulation of the alkali metal silicate when added to the polyol. Any suitable alkali metal hydroxide such as sodium hydroxide, potassium hydroxide and mixtures thereof may be used for this purpose.

Component (b)

Any suitable liquid polyol (organic polyhydroxyl compound), in particular, compounds which contain from 2 to 8 hydroxyl groups, especially those with a molecular weight of about 400 to about 6,000, e.g., polyesters, polyethers, polythioethers, polyacetals, polycarbonates or polyester amides containing at least 2, generally from 2 to 8, but, preferably, dihydric alcohols, with the optional addition of trihydric alcohols, and polybasic, preferably dibasic, carboxylic acids. Instead of the free polycarboxylic acids, the corresponding polycarboxylic acid anhydrides or corresponding polycarboxylic acid anhydrides or corresponding polycarboxylic acid esters of lower alcohols or their mixtures may be used for preparing the polyesters. The polycarboxylic acid may be aliphatic, cycloaliphatic, aromatic and/or heterocyclic and may be substituted, e.g., with halogen atoms and may be unsaturated; examples include: Succinic acid, adipic acid, sebacic acid, suberic acid, azelaic acid, phthalic acid, phthalic acid anhydride, isophthalic acid, tetrahydrophthalic acid anhydride, trimellitic acid, hexahydrophthalic acid anhydride, tetrachlorophthalic acid anhydride, endomethylene tetrahydrophthalic acid anhydride, glutaric acid anhydride, fumaric acid, maleic acid, maleic acid anhydride, dimeric and trimeric fatty acids such as oleic acid, optionally mixed with monomeric fatty acids, dimethylterephthalate and bis-glycol terephthalate. Any suitable polyhydric alcohol may be used, such as, for example, ethylene glycol; propylene-1,2- and -1,3-glycol; butylene-1,4- and -2,3-glycol; hexane-1,6-diol; octane-1,8-diol; neopentyl glycol; cyclohexanedimethenol-1(1,4-bis-hydroxymethylcyclohexane); 2-methylpropane-1,3-diol; glycerol; trimethylol propane; pentaerythritol; quinitol; mannitol and sorbitol; methyl glycoside; diethylene glycol; triethylene glycol; tetraethylene glycol; polyethylene glycols; dipropylene glycol; polypropylene glycols; dibutylene glycol and polybutylene glycols. The polyesters may also contain a proportion of carboxyl end groups. Polyesters of lactones, such as ε-caprolactone, or hydroxycarboxylic acid, such as ω-hydroxycaproic acid, may also be used.

The polyethers with at least 2, generally from 2 to 8 and, preferably, 2 or 3 hydroxyl groups used according to the invention are known and may be prepared, e.g., by the polymerization of epoxides such as ethylene oxide, propylene oxide, butylene oxide, tetrahydrofurane oxide, styrene oxide or epichlorohydrin, each with itself, e.g., in the presence of $BF_3$, or by addition of these epoxides, optionally as mixtures or successively, to starting components which contain reactive hydrogen atoms such as alcohols or amines, e.g., water, ethylene glycol; propylene-1,3- or -1,2-glycol; trimethylol propane; 4,4-dihydroxydiphenyl propane, aniline, ammonia, ethanolamine or ethylenediamine; sucrose polyethers such as those described, e.g., in German Auslegeschriften Nos. 1,175,358 and 1,064,938, may also be used according to the invention. It is frequently preferred to use polyethers which contain predominantly primary OH groups (up to 90% by weight, based on the total OH groups contained in the polyether). Polyethers modified with vinyl polymers such as those which may be obtained by the polymerizing styrene or acrylonitrites in the presence of polyethers (U.S. Pat. Nos. 3,383,351; 3,304,273; 3,523,093 and 3,110,695; and German Pat. No. 1,152,536) and polybutadienes which contain OH groups are also suitable.

By "polythioethers" are meant, in particular, the condensation of thiodiglycol with itself and/or with other glycols, dicarboxylic acids, formaldehyde, aminocarboxylic acids or amino alcohols. The products obtained are polythio-mixed ethers or polythioether ester amides, depending on the co-component.

The polyacetals used may be, for example, the compounds which may be obtained from glycols, 4,4′-dihydroxydiphenylmethylmethane, hexanediol, and formaldehyde. Polyacetals suitable for the invention may also be prepared by the polymerization of cyclic acetals.

The polycarbonates with hydroxyl groups used may be of the kind, for instance, which may be prepared by reactions diols, e.g., propane-1,2-diol; butane-1,4-diol; and/or hexane-1,6-diol or diethylene glycol, triethylene glycol or tetraethylene glycol, with diarylcarbonates, e.g., diphenylcarbonates or phosgene.

The polyester amides and polyamides include, e.g., the predominantly linear condensates obtained from polyvalent saturated and unsaturated carboxylic acids or their anhydrides, any polyvalent saturated and unsaturated amino alcohols, diamines, polyamines and mixtures thereof.

Polyhydroxyl compounds which contain urethane or urea groups, modified or unmodified natural polyols, e.g., castor oil, carbohydrates and starches, may also be used. Additional products of alkylene oxides with phenol formaldehyde resins or with urea-formaldehyde resins are also suitable for the purpose of the invention.

Examples of these compounds which are to be used according to the invention have been described in High Polymer, Volume XVI, "Polyurethane, Chemistry and Technology," published by Saunders-Frisch Interscience Publishers, New York, London, Volume I, 1962, pages 32 to 42 and pages 44 to 54; and Volume II, 1964, pages 5 and 16 and pages 198 and 199; and in Kunststoff-Handbuch, Volume VII, Vieweg-Hochtlen, Carl-Hanser-Verlag, Munich, 1966, on pages 45 to 71.

Component (c)

Any suitable salt of alkali metal or alkaline earth metal compound and organic acids may be used in this invention. Suitable organic acids such as aliphatic carboxylic acids, aliphatic acid anhydrides, aliphatic polycarboxylic acids, cycloaliphatic carboxylic acids, cycloaliphatic polycarboxylic acids, aromatic carboxylic acid, aromatic polycarboxylic acids, heterocyclic polycarboxylic acids, aliphatic carboxylic acid anhydrides, aromatic carboxylic acid anhydrides and mixtures thereof may be reacted with alkali metal compounds to produce suitable salts. The organic acids may be substituted, e.g., with halogen atoms and may be unsaturated.

Salt of alkali metals and organic acids are preferred. Trisodium phosphate is the preferred salt. It is preferred to use the organic mono-carboxylic acids.

Examples of suitable aliphatic acids which may be used to produce suitable salts are, but are not limited to, acetic acid, propionic acid, formic acid, butyric acid, valeric acid, caproic acid, undecanoic acid, lauric acid, palmitic acid, stearic acid, etc.

An example of suitable aliphatic acid anhydrides which may be used to produce suitable salt is acetic anhydride, but examples are not limited to that.

Examples of suitable aromatic acids which may be used to produce suitable salts are, but are not limited to, benzoic acid, para-aminobenzoic acid, salicyclic acid, methyl salicylate, etc.

The polycarboxylic acid which may be used to produce suitable salt may be aliphatic, cycloaliphatic, aromatic and/or heterocyclic and may be substituted, e.g., with halogen atoms and may be unsaturated; examples include: Succinic acid, adipic acid, sebacic acid, suberic acid, azelaic acid, phthalic acid, phthalic acid anhydride, isophthalic acid, tetrahydrophthalic acid anhydride, trimellitic acid, hexahydrophthalic acid anhydride, tetrachlorophthalic acid anhydride, endomethylene tetrahydrophthalic acid anhydride, glutaric acid anhydride, fumaric acid, maleic acid, maleic acid anhydride, dimeric and trimeric fatty acid such as oleic acid, optionally mixed with monomeric fatty acids, dimethylterephthalate and bis-glycol terephthalate.

The stable polyol-alkali metal silicate emulsion is useful in the production of polyurethane silicate resinous and foamed products. The polyol-alkali metal silicate emulsion may be used in the polyurethane foaming machines which are made to handle a filler in the polyol component, usually called Component (b). The polyol-alkali metal silicate emulsion, optionally containing an amine catalyst, blowing agent and surface-active agent, is mixed with a polyisocyanate or isocyanate-terminated polyurethane prepolymer and is allowed to react, thereby producing a polyurethane silicate resinous or foamed product. The polyurethane silicate foam and resinous products have many uses, such as for thermal and sound insulation, as light-weight construction panels, and as coating agents for wood, metal and plastics.

The polyol-alkali metal silicate emulsion may also be used to produce alkali metal polyester silicate resinous products as outlined in U.S. patent application, Ser. No. 122,015, now abandoned, filed on Feb. 19, 1980 by David H. Blount, M.D. The polyester alkali metal silicate resinous products may be used to produce polyurethane silicate resinous and foam products. The unsaturated alkali metal polyester silicate may be reacted with a vinyl monomer in the presence of a peroxide catalyst to produce solid resinous products.

The preferred method to produce polyol-alkali metal silicate emulsion is to mix the polyol and salt of an alkali metal compound and a weak acid, then to add the alkali metal silicate while agitating between ambient temperature and 100° C. at ambient pressure for 10 to 60 minutes, then to cool the mixture while agitating, thereby producing a stable polyol-alkali metal silicate emulsion.

The components may be mixed in any suitable method, such as simultaneously or by mixing any two components first, then adding the third component last, agitating between ambient temperature and 100° C. for 10 to 60 minutes, then cooling while still agitating.

The components may be mixed in any suitable proportions, the preferred proportions being 1 to 50 parts by weight of an aqueous alkali metal silicate solution to 25 parts by weight of a polyol. Suitable salt is added in the amount of 1% to 20% by weight, percentage based on weight of the aqueous alkali metal silicate solution.

The primary objects of this invention is to produce stable polyol-alkali metal silicate emulsions. Another object is to product stable polyol-alkali metal silicate emulsions which will react with polyisocyanate compounds to produce useful polyurethane silicate solid and foamed products. Another object is to produce stable polyol-alkali metal silicate emulsions that will react with polycarboxyl acids and polycarboxyl acid anhydrides to produce alkali metal polyester silicate resins. Another object is to produce a stable vinyl polymer-polyol-alkali metal silicate emulsion.

Other components may be added with the components in the production of polyol-alkali metal silicate emulsion, especially when the emulsion is to be used to produce polyurethane silicate foam. Any suitable amine compound may be added, preferably in an amount up to 10% by weight, percentage based on the weight of Components (a), (b) and (c). Tertiary amines are the preferred amine. Tertiary amines are the preferred amine. Suitable tertiary amines include, but are not limited to, triethylamine, tributylamine, triethylenediamine; N-methyl-morpholine; N,N,N',N'-tetramethylenediamine; triethanolamine; N-methyl-diethanolamine and mixtures thereof.

Up to 1% by weight of organo-metallic compounds may be added with Components (a), (b) and (c), percentage based on the weight of Components (a), (b) and (c), preferably organic-tin compounds such as tin salts of carboxylic acid, e.g., tin acetate, tin octoate, tin ethyl hexoate, tin laurate and the dialkyl tin salts of carboxylic acids, such as dibutyl tin diacetate, dibutyl tin dilaurate, dibutyl-tin maleate or diocyl-tin diacetate.

Up to 20% by weight of a surface-active additive (emulsifiers and foam stabilizers), percentage based on weight of Components (a), (b) and (c), may be added with the Components (a), (b) and (c). Suitable emulsifiers are, e.g., the sodium salts of ricinoleic sulphonates or of fatty acids or salts of fatty acid with amines, e.g., oleic acid diethylamine or stearic acid diethanolamine. Other surface-active additives are: Alkali metal or ammonium salts of sulphonic acid, e.g., dodecylbenzene sulphonic acid or dinaphthyl methane disulphonic acid; or fatty acids such as ricinoleic acid, or polymeric fatty acids. The foam stabilizers used are mainly water-soluble polyester siloxanes. These compounds generally have a polydimethylsiloxane group attached to a copolymer of ethylene oxide and propylene oxide. Foam stabilizers of this kind have been described in U.S. Pat. No. 3,629,308.

Suitable polymeric additives which are water-soluble and have the ability to hydrate and swell may be used as dispersion stabilizers in this invention.

Dispersion stabilizers such as salts of polymethacrylic acid, copolymeric poly(methacrylic acids), polymaleic acids and copolymeric polymaleic acids; water-soluble derivatives of cellulose, plant gums, casein, starch, sodium alginate; bentonite, natural and synthetic latexes, sulfonated polyisoprene resins, sulfonated phenol-formaldehyde resins, sulfonated melamine-formaldehyde resins, polyamines, polysilicic acid, sodium poly(methacrylic silicate), poly(sodium acrylic silicate), copolymeric poly(sodium acrylic silicate), poly(sodium methacrylic silicate), copolymeric poly(sodium methacrylic silicate), polyvinyl decanol, and mixtures thereof. The dispersion stabilizer may be used in an amount up to 10% by weight, percentage based on the polyol-alkali metal silicate emulsion.

Any suitable vinyl monomer may be used in this invention. Suitable vinyl monomers include, but are not limited to, styrene, vinyl acetate, sodium acrylate, acrylates, vinyl chloride, vinylidine chloride, acrylonitrile, vinyl toluenes, N-vinyl carbozole, vinyl pyrovidone, vinylidine cyanide, alkyl vinyl ketones, aryl vinyl ketones, methacrylonitrile and mixtures thereof.

Suitable acrylate compounds include, but are not limited to, methyl methacrylate, methyl acrylate, ethyl acrylate, propyl acrylate, butyl acrylate, pentadecyl acrylate, hexadecyl acrylate, benzyl acrylate, cyclohexl acrylate, phenyl ethyl acrylate, ethyl methacrylate, methyl chloroacrylate, 2-chloro-ethyl acrylate; 1,1-dihydroperfluorobutyl acrylate; ethylenemethacrylate, lauryl acrylate, cyclohexyl-cyclohexyl methacrylate, allyl methacrylate and mixtures thereof.

Acrylic acid compounds should be first reacted with an alkali metal radical to produce an alkali metal acrylate. Suitable acrylic acid compounds include, but are not limited to, acrylic acid, methacrylic acid, sthyl acrylic acid, benzyl acrylic acid, chloroacrylic acid, cyclohexyl acrylic acid, fluoroacrylic acid, cyclohexyl methacrylic acid, isobutyl methacrylic acid, crotonic acid and mixtures thereof.

Up to 50% by weight of an organic diene may be added with the vinyl monomer, percentage based on the weight of the vinyl monomer. Suitable organic dienes include, but are not limited to, isoprene, chloroprene, butadiene and mixtures thereof. The organic dienes are added at a temperature and pressure wherein the diene is in a liquid or pressurized state.

Any suitable initiator which will promote the polymerization of a solution of a vinyl monomer may be used in this invention. The controlled polymerization of the vinyl monomer in the aqueous alkali metal silicate, in order to yield fully cured solids, usually requires the use of an initiator. Only a catalytic amount of an initiator is needed and the amount may vary up to 1% by weight based on the vinyl monomer.

Any suitable free-radical initiator, such as organic and inorganic peroxides, azo compounds, alkali metal persulfates, ammonium persulfates and mixtures thereof, may be used. The fact that the action of organic peroxide can be modified by activators and promoters, plus their ready availability at reasonable cost, makes them preferable in this invention. Thermal and photo-polymerization may be used in certain cases.

Suitable organic peroxide initiators include, but are not limited to, acetyl benzoyl peroxide, methyl ethyl ketone peroxide, cyclohexanone peroxide, cyclohexyl hydroperoxide, 2,4-dichlorobenzoyl peroxide, cumene hydroperoxide, tert-butyl hypoperoxide, methyl amyl ketone peroxide, lauroyl peroxide, benzoyl peroxide, tert-butyl perbenzoate, di-tert-butyl diperphthalate, and mixtures thereof.

Activators and promoters, used in conjunction with the initiators such as cobalt which, in the form of its ethyl hexanoate or naphthanate salt, is a good, general-purpose activator for use with ketone peroxides, may be added to the vinyl monomer. Concentration as low as 30 ppm of cobalt metal will activate a system.

Other activators may be added to the vinyl monomers such as tertiary dialkyl aryl amines, e.g., diethyl aniline, and aliphatic thiols, e.g., lauryl mercaptan, when acyl peroxides are used. When alkali metal or ammonium persulfates are used, ferric sulfate and cupric sulfate may be added to the unsaturated polyester resin.

Promoters used with acyl peroxide include tertiary dialkyl aryl amines such as diethyl aniline, and aliphatic thiols, such as, for example, lauryl mercaptan. Concentrations used are most often in the range of up to 0.5% of active substances. Promoters usually are strong reducing agents and initiators are strong oxidizing agents.

Suitable alkali metal persulfates include potassium and sodium persulfate. Redox systems may also be utilized in this invention.

The stable vinyl monomer polyol-alkali metal silicate emulsion is useful in the production of vinyl polymer-polyurethane silicate resinous and foamed products.

The vinyl polymer-polyol-alkali metal silicate emulsion may be used in the polyurethane foaming machines which are made to handle a filler in the polyol component, usually called Component (b). The vinyl polymer-polyol-alkali metal silicate emulsion, optionally containing an amine catalyst, blowing agent, organo-metallic compound and surface-active agent, is mixed with a polyisocyanate or isocyanate-terminated polyurethane prepolymer and is allowed to react, thereby producing a vinyl polymer-polyurethane silicate resinous or foamed product. The vinyl polymer-polyurethane silicate foam and resinous products have many uses, such as for thermal and sound insulation, as light-weight construction panels, and as coating agents for wood, metal and plastics.

The preferred method to produce vinyl polymer polyol-alkali metal silicate emulsion is to mix the polyol, vinyl monomer, peroxide initiator and suitable salt, then to add the alkali metal silicate while agitating between ambient temperature and the boiling point of the vinyl monomer at ambient pressure for 10 to 60 minutes except when the vinyl monomer is a gas, then to cool the mixture while agitating, thereby producing a stable vinyl polymer-polyol-alkali metal silicate emulsion. When the vinyl monomer is a gas such as vinyl chloride, it is slowly added to the mixture of the component while agitating in a closed system at a suitable temperature.

The components may be mixed in any suitable method, such as simultaneously or by mixing any two components first, then adding the third component last, agitating between ambient temperature and 100° C. for 10 to 60 minutes, then colling while still agitating.

The components may be mixed in any suitable proportions, the preferred proportions being 1 to 50 parts by weight of an aqueous alkali metal silicate solution to 25 parts by weight of a polyol and 1 to 50 parts by weight of a vinyl monomer and a catalytic amount of a peroxide initiator. The salt is added in the amount of 1% to 20% by weight, percentage based on weight of the aqueous alkali metal silicate solution.

DESCRIPTION OF PREFERRED EMBODIMENTS

My invention will be illustrated in greater detail in the specific Examples which follow, which detail the preferred embodiment of my process. It should be understood that the scope of my invention is not limited to the specific processes set out in the Examples. Parts and percentages are by weight, unless otherwise indicated.

EXAMPLE 1

Sodium metasilicate pentahydrate is heated to from 70° C. to 80° C. until the sodium metasilicate pentahydrate melts. About equal parts by weight of the melted sodium metasilicate pentahydrate and polyethylene glycol (mol. wt. 480), containing 15% by weight of sodium carbonate and 2% by weight of sodium doctyl sulfosuccinate, are thoroughly agitated until the mixture is emulsified, thereby producing a stable polyol-alkali metal silicate emulsion.

About equal parts by weight of the polyol-alkali metal silicate emulsion and TDI (tolylene diisocyanate) are thoroughly mixed. The mixture expands to produce a semi-rigid polyurethane silicate foam which may be cut into panels and used for thermal and sound insulation in buildings, automobiles, airplanes, etc.

EXAMPLE 2

About 50 parts by weight of a polyether triol (hydroxyl no. 56), 15 parts by weight of trisodium phosphate, 2 parts by weight of potassium doctyl sulfosuccinate and 70 parts by weight of an aqueous sodium silicate solution, containing 60% sodium silicate with an $NaO:SiO_2$ ratio of about 1:1.75, are mixed, then heated to about 50° C. while vigorously agitating, thereby producing a stable polyol-alkali metal silicate emulsion.

The polyol-alkali metal silicate emulsion may be used to produce flexible foam by mixing 100 parts by weight of the polyol-alkali metal silicate emulsion, 0.25 part by weight of tin oxalate. 0.25 part by weight of diethylenediamine and 50 parts by weight of TDI; the mixture expands to produce a flexible polyurethane silicate foam weighing from 1 to 2 pounds/cubic foot. This foam may be used for padding, packaging, cushions, insulation, etc.

EXAMPLE 3

About 50 parts by weight of an amine sucrose polyol (Poly G 71-530 produced by Olin), 10 parts by weight of sodium acetate, 5 parts by weight of sodium benzoate and 70 parts by weight of sodium metasilicate pentahydrate are mixed, heated to about 70° C., then agitated for 3 to 10 minutes, thereby producing a stable polyol-alkali metal silicate emulsion.

EXAMPLE 4

About 200 grams of polyethylene glycol (mol. wt. 600), 200 grams of an aqueous solution containing 60% of sodium silicate ($NaO:SiO_2$ ratio of about 1:2), 10 grams of polyvinyl alcohol and 14 parts by weight of sodium salt of adipic acid are mixed and heated to about 50° C., then put into a malt mixing machine and mixed for 1 to 3 minutes, thereby producing a stable polyol-alkali metal silicate emulsion.

EXAMPLE 5

A comparison study was done using the same process and components of Example 4, except that the salt was left out. The mixture emulsified, but within a few hours, the sodium silicate precipitated and formed a firm mass in the bottom of the container and would not re-emulsify with agitation. The polyol-alkali metal silicate emulsion of Example 1 remained stable for several days; very little of the sodium silicate settled to the bottom after a day and this was easily emulsified by agitation.

EXAMPLE 6

About equal parts by weight of an aqueous solution, containing 55% by weight of sodium silicate, with an $NaO:SiO_2$ ratio of about 1:1.75, and a polyol listed below were mixed with about 10% by weight of a sodium salt of an organic acid listed below, based on the alkali metal silicate, 2% by weight of sodium doctyl sulfosuccinate, based on reactants, 1% by weight of a silicone surfactant, and 3% of starch, based on reactant, and 0.5% by weight of triethylenediamine, based on weight of reactants. The mixture was then vigorously agitated at about 50° C., agitation continuing until the mixture cooled to about 30° C., thereby producing a stable polyol-alkali metal silicate emulsion.

| Example | Polyol | Organic acid |
|---|---|---|
| a | Ethylene glycol (mol. wt. 380); | Phthalic acid; |
| b | Ethylene glycol (mol. wt. 600); | Phthalic anhydride; |
| c | Ethylene glycol (mol. wt. 1000) with equal parts of propylene glycol (mol. wt. 600); | Equal parts benzoic acid and adipic acid; |
| d | Propylene glycol (mol. wt. 600); | Para-aminobenzoic acid with equal parts by weight of acetic acid; |
| e | Propylene glycol (mol. wt. 1200); | Equal parts by weight of adipic acid and propionic acid; |
| f | Castor oil; | Acetic acid; |
| g | Ethylene polyether triol (hydroxyl No. 56); | Isophthalic acid and fumaric acid; |
| h | Ethylene polyether diol (hydroxyl No. 112); | Maleic anhydride; |
| i | Ethylene polyether diol (hydroxyl No. 56); | Oleic acid; |
| j | Amine surcose polyether polyol (hydroxyl No. 350); | Equal parts by weight of tetrachlorophthalic acid anhydride and fumaric acid; |
| k | Polyester resin (0.5 mol. of adipic acid and 4 mols of glycerol); | Equal parts by weight of acetic acid and azelaic acid; |
| l | Glycerol; | Glutaric acid anhydride; |
| m | Equal parts by weight of ethylene glycol (mol. wt. 380) and starch; | Equal parts by weight of adipic acid and glycolic acid; |
| n | 5 parts by weight of ethylene glycol (mol. wt. 600) and 1 part by weight of resorcinol; | 4-hydroxycaproic acid and equal parts by weight of paraaminobenzoic acid; |
| o | Equal parts by weight of polypropylene diol (mol. wt. 600) and cellulose powder; | Equal parts by weight of adipic acid and propionic acid; |
| p | Liquid formaldehyde phenol resin with free hydroxyl group and equal parts by weight of trichlorobutylene oxide; | Equal parts by weight of malic acid and phthalic acid anhydride; |
| q | Ethylene-propylene polyether diol (hydroxyl No. 33.5). | Adipic acid. |

EXAMPLE 7

Sodium metasilicate pentahydrate is heated to from 70° C. to 80° C. until the sodium metasilicate pentahydrate melts. About equal parts by weight of the melted sodium metasilicate pentahydrate, styrene monomer and polyethylene glycol (mol. wt. 480), containing 5% by weight of sodium carbonate and 5% by weight of trisodium phosphate, 0.5% of benzoyl peroxide, 0.05% of cobalt naphthanate and 2% by weight of sodium doctyl sulfosuccinate are thoroughly agitated at 45° C. until the mixture is emulsified, thereby producing a stable polyol-alkali metal silicate emulsion.

About equal parts by weight of the vinyl polymer-polyol-alkali metal silicate emulsion and TDI (tolylene diisocyanate) are thoroughly mixed. The mixture expands to produce a semi-rigid vinyl polymer-polyurethane silicate foam which may be cut into panels and used for thermal and sound insulation in buildings, automobiles, airplanes, etc.

EXAMPLE 8

About 200 grams of polyethylene glycol (mol. wt. 600), 200 grams of an aqueous solution containing 60% of sodium silicate (NaO:$SiO_2$, ratio of about 1:2), 100 parts by weight of acrylonitrile, 0.5 part by weight of potassium persulfate, 10 parts by weight of sodium carbonate and 0.05 part by weight of ferric sulfate are mixed and heated to about 40° C., then put into a malt mixing machine and are mixed for 1 to 3 minutes, thereby producing a stable vinyl polymer-polyol-alkali metal silicate emulsion.

EXAMPLE 9

A comparison study was done, using the same process and components of Example 4, except that the sodium carbonate was left out. The mixture emulsified, but within a few hours, the sodium silicate precipitated and formed a firm mass in the bottom of the container and would not readily re-emulsify with agitation. The vinyl polymer polyol-alkali metal silicate emulsion of Example 8 remained stable for several days; very little of the sodium silicate settled to the bottom after a day and this was easily re-emulsified by agitation.

EXAMPLE 10

About equal parts by weight of an aqueous solution, containing 55% by weight of sodium silicate, with an $Na_2O:SiO_2$ ratio of about 1:1.75, vinylidene chloride and a polyol listed below were mixed with about 10% by weight of a sodium salt of an organic acid listed below, based on the alkali metal silicate, 2% by weight of sodium doctyl sulfosuccinate, based on reactants, 1% by weight of a silicone surfactant, based on reactants, and 0.5% by weight of triethylenediamine, based on weight of the reactants. The mixture was then vigorously agitated at about 40° C. in a closed system; agitation was continued until the mixture cooled to about 30° C., thereby producing a stable vinyl polymer-polyol-alkali metal silicate emulsion.

| Example | Polyol | Organic acid |
|---|---|---|
| a | Ethylene glycol (mol. wt. 380); | Phthalic acid; |
| b | Ethylene glycol (mol. wt. 600); | Phthalic anhydride; |
| c | Ethylene glycol (mol. wt. 1000) with equal parts of propylene glycol (mol. wt. 600); | Equal parts benzoic acid and adipic acid; |
| d | Propylene glycol (mol. wt. 600); | Para-aminobenzoic acid with equal parts by weight of acetic acid; |
| e | Propylene glycol (mol. wt. 1200); | Equal parts by weight of adipic acid and propionic acid; |
| f | Castor oil; | Acetic acid; |
| g | Ethylene polyether triol (hydroxyl No. 56); | Isophthalic acid and fumaric acid; |
| h | Ethylene polyether diol (hydroxyl No. 112); | Maleic anhydride; |
| i | Ethylene polyether diol (hydroxyl No. 56); | Oleic acid; |
| j | Amine surcose polyether polyol (hydroxyl No. 350); | Equal parts by weight of tetrachlorophthalic acid anhydride and fumaric acid; |
| k | Polyester resin (0.5 mol. of adipic acid and 1.4 mols of glycerol); | Equal parts by weight of acetic acid and azelaic acid; |

-continued

| Example | Polyol | Organic acid |
|---|---|---|
| l | Glycerol; | Glutaric acid anhydride; |
| m | Equal parts by weight of ethylene glycol (mol. wt. 380) and starch; | Equal parts by weight of adipic acid and glycolic acid; |
| n | 5 parts by weight of ethylene glycol (mol. wt. 600) and 1 part by weight of resorcinol; | Hydroxycaproic acid and equal parts by weight of para-aminobenzoic acid; |
| o | Equal parts by weight of polypropylene diol (mol. wt. 600) and cellulose powder; | Equal parts by weight of adipic acid and propionic acid; |
| p | Liquid formaldehyde phenol resin with free hydroxyl group and equal parts by weight of trichlorobutylene oxide; | Equal parts by weight of malic acid and phthalic acid anhydride; |
| q | Ethylene-propylene polyether diol (hydroxyl No. 33.5). | Adipic acid. |

EXAMPLE 11

About 50 parts by weight of an aqueous solution containing about 50% by weight of sodium silicate, with an $SiO_2:Na_2O$ ratio of 2:1, 15 parts by weight of a polyethylene triol (hydroxyl No. 56, mol. wt. 1000), 10 parts by weight of styrene, 5 parts by weight of a monomer listed below, 5 parts by weight of trisodium phosphate, 10 parts by weight of sodium carbonate, 0.5 part by weight of sodium doctyl sulfosuccinate, 0.5 part by weight of triethylenediamine, 0.05 part by weight of cobalt naphthanate, 0.05 part by weight of tin octoate, 0.1 part by weight of potassium persulfate, 0.1 part by weight of benzoyl peroxide, 0.05 part by weight of N,N-dimethyl aniline, 0.005 part by weight of cupric sulfate and 5 parts by weight of methyl cellulose are mixed. The mixture is vigorously agitated at a temperature just below the boiling temperature of the vinyl monomer in a closed system until the mixture is emulsified and is then cooled to ambient temperature while agitating, thereby producing a stable vinyl copolymer-polyol-alkali metal silicate emulsion. About 0.5 part by weight of hydroquinone is added to the emulsion.

| Example | Vinyl monomer |
|---|---|
| a | Methyl methacrylate; |
| b | Acrylonitrile; |
| c | Vinylidene chloride; |
| d | Sodium methacrylate; |
| e | Vinyl acetate; |
| f | N—vinyl carbazole; |
| g | Vinyl pyrovidone; |
| h | Methacrylonitrile; |
| i | Ethyl acrylate; |
| j | Methyl acrylate; |
| k | Allyl methacrylate; |
| l | Vinyl toluene. |

EXAMPLE 12

About 50 parts by weight of an aqueous sodium silicate solution, containing about 40% sodium silicate with a $SiO_2:Na_2O$ ratio of 3.22:1, one part by weight of sodium hydroxide, 15 parts by weight of styrene, 5 parts by weight of a vinyl monomer listed below, 10 parts by weight of an organic diene listed below, 20 parts by weight of a polyethylene glycol (mol. wt. 600), 0.5 part by weight of benzoyl peroxide, 0.1 part by weight of p-methane hydroperoxide, 0.1 part by weight of ferrous sulfate heptahydrate, 0.2 part by weight of tert-dodecyl mercaptan, 0.2 part by weight of diethylenetriamine, 0.05 part by weight of N,N-dimethyl aniline, 0.05 part by weight of cobalt naphthanate, 0.01 part by weight of tin octoate and 10 parts by weight of sodium carbonate and 5 parts by weight of trisodium phosphate are mixed in an autoclave with an agitator and a method to control the temperature. The mixture is agitated at a temperature and pressures wherein the vinyl monomers and organic dienes are in a pressurized or liquid state until the reaction of the vinyl monomers and organic diene is complete, thereby producing a vinyl polymer-polyol-alkali metal silicate emulsion. The reaction is usually complete within 12 hours. An antioxidant, phenyl β-naphthylamine and hydroquinone, in an amount of 0.1 part by weight of each, are added to the emulsion when the reaction is about 70% complete.

| Example | Vinyl monomer | Organic dienes |
|---|---|---|
| a | Methyl methacrylate; | Butadiene at about 50° C. and a pressure of 45 to 60 psig; |
| b | Acrylonitrile; | Butadiene at about 5° C. to 50° C. at a pressure of 45 to 60 psig; |
| c | Vinyl chloride slowly added at 45° C. to 55° C.; | Isoprene at ambient pressure; |
| d | Vinylidene chloride at 40° C.; | Chloroprene at ambient pressure; |
| e | Vinyl acetate at 40° C.; | Isoprene at ambient pressure; |
| f | Methyl styrene at 40° C.; | Isoprene at ambient pressure; |
| g | Styrene at 40° C.; | Isoprene at ambient pressure; |
| h | Sodium acrylate at 40° C. | Isoprene at ambient pressure. |

Although specific conditions and ingredients have been described in conjunction with the above Examples of preferred embodiments, these may be varied and other reagents and additives may be used, where suitable, as described above, with similar results.

Other modifications and applications of this invention will occur to those skilled in the art, upon reading this disclosure. These are intended to be included within the scope of this invention as defined in the appended claims.

I claim:

1. The process for the production of a stable polyol-alkali metal silicate emulsion by mixing the following components:
  (a) aqueous alkali metal silicate solution, 1 to 50 parts by weight;
  (b) polyol, 25 parts by weight;
  (c) alkali metal salt of a weak acid, 1% to 20% by weight, percentage based on weight of alkali metal silicate solution.

2. The process of claim 1 wherein the alkali metal silicate is selected from the group consisting of sodium silicate, potassium silicate, lithium silicate and mixtures thereof.

3. The process of claim 1 wherein the polyol is selected from the group consisting of polyhydric alcohol, polyesters, polyethers, polythioethers, polyacetals, polycarbonates, polyester amides containing at least 2 hydroxy groups, and mixtures thereof.

4. The process of claim 1 wherein the salt is the reaction product of an alkali metal compound and organic acid, and organic acid is selected from the group consisting of aliphatic carboxylic acid, aliphatic polycarboxylic acid, cycloaliphatic carboxylic acid, cycloaliphatic polycarboxylic acid, aromatic carboxylic acid, aromatic polycarboxylic acid, heterocyclic polycarboxylic acid, aliphatic carboxylic acid anhydrides, aromatic carboxylic acid anhydrides and mixtures thereof.

5. The process of claim 1 wherein the salt is selected from the group consisting of sodium carbonate, potassium carbonate, trisodium phosphate and mixtures thereof.

6. The product produced by the process of claim 1.

7. The process of claim 1 wherein an amine compound in the amount of up to 10% is added with components (a), (b) and (c).

8. The process of claim 1 wherein the amine compound is a tertiary amine.

9. The process of claim 1 wherein up to 20% by weight of an emulsifying agent is added to the components (a), (b) and (c), percentage based on weight of components (a), (b) and (c).

10. The process of claim 1 wherein up to 20% by weight of a foam stabilizer, percentage based on components (a), (b) and (c), is added with components (a), (b) and (c).

11. The process of claim 1 wherein a vinyl monomer, 1 to 50 parts by weight, and a catalytic amount of a peroxide initiator are added with components (a), (b) and (c).

12. The process of claim 11 wherein the vinyl monomer is selected from the group consisting of alkali metal acrylate, acrylate compounds, styrene, vinyl acetate, vinyl chloride, vinylidene chloride, acrylonitrile, vinyl toluenes, N-vinyl carbazole, vinyl pyrovidone, vinylidine cyanide, alkyl vinyl ketones, aryl vinyl ketones, methacrylonitrile and mixtures thereof.

13. The process of claim 11 wherein the vinyl monomer is styrene.

14. The product produced by the process of claim 11.

15. The process of claim 1 wherein 1 to 50 parts by weight of a vinyl monomer, up to an equal amount by weight of an organic diene, based on the vinyl monomer, and selected from the group consisting of isoprene, chloroprene, butadiene and mixtures thereof, and a catalytic amount of a peroxide initiator are added with components (a), (b) and (c) of claim 1.

16. The product produced by the process of claim 15.

17. The process of claim 1 wherein up to 10% by weight of a dispersion stabilizer, selected from the group consisting of starch, water-soluble derivatives of cellulose, plant gums, casein, bentonite, natural and synthetic latex, sulfonated polyisoprene resins, sulfonated phenol-formaldehyde resins, sulfonated melamine-formaldehyde resin; salts of polymethacrylic acid, copolymeric poly(methacrylic acid), polymaleic acid and copolymeric polymaleic acid; polyamines, polysilicic acid, poly(sodium methacrylic silicate), poly(sodium acrylic silicate), copolymeric poly(sodium acrylic silicate), poly(sodium methacrylic silicate), copolymeric (sodium methacrylic silicate), polyvinyl alcohol and mixtures thereof, percentage based on the weight of the polyol-alkali metal silicate emulsion, is added to the mixture.

* * * * *